(12) United States Patent
Chen et al.

(10) Patent No.: US 10,333,438 B1
(45) Date of Patent: Jun. 25, 2019

(54) MOTOR DRIVING CIRCUIT

(71) Applicant: ANPEC ELECTRONICS CORPORATION, Hsinchu (TW)

(72) Inventors: Kun-Min Chen, Hsinchu (TW); Ching-Feng Lai, Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/114,338

(22) Filed: Aug. 28, 2018

(30) Foreign Application Priority Data

May 25, 2018 (TW) .............................. 107117954 A

(51) Int. Cl.
  *H02P 6/16* (2016.01)
  *G01D 5/14* (2006.01)
  *G05B 19/042* (2006.01)
  *G05F 1/10* (2006.01)

(52) U.S. Cl.
  CPC .............. *H02P 6/16* (2013.01); *G01D 5/145* (2013.01); *G05B 19/0423* (2013.01); *G05F 1/10* (2013.01)

(58) Field of Classification Search
  CPC .............. H02P 6/15; H02P 6/16; G01D 5/142
  See application file for complete search history.

(56) References Cited

U.S. PATENT DOCUMENTS

| 9,602,036 | B2* | 3/2017 | Chen | ................... H02P 23/0004 |
| 2013/0093373 | A1* | 4/2013 | Chen | ................... H02H 7/0838 |
|  |  |  |  | 318/400.21 |
| 2015/0023801 | A1* | 1/2015 | Tsai | ........................ H02P 23/22 |
|  |  |  |  | 417/42 |
| 2016/0352279 | A1* | 12/2016 | Mishima | ................. H02P 27/08 |
| 2016/0380565 | A1* | 12/2016 | Chen | ....................... H02P 6/085 |
|  |  |  |  | 318/504 |

* cited by examiner

*Primary Examiner* — Thai T Dinh
(74) *Attorney, Agent, or Firm* — Li & Cai Intellectual Property (USA) Office

(57) ABSTRACT

The present disclosure provides a motor driving circuit, which includes a position detecting circuit, a drive processing circuit, an adjusting voltage source, a parameter reading unit and a timing unit. The timing unit generates a timing signal, and the parameter reading unit processes the timing signal to obtain a consecutive first time interval and a second time interval. The parameter reading unit reads a first functional parameter voltage of a functional parameter pin in the first time interval and generates first functional parameter data to be written into a first register, and reads a second functional parameter voltage of a functional parameter pin in the second time interval and generates second functional parameter data to be written into a second register. The drive processing circuit drives a motor according to the first functional parameter data and the second functional parameter data.

10 Claims, 6 Drawing Sheets

MOTOR DRIVING CIRCUIT

CROSS-REFERENCE TO RELATED PATENT APPLICATION

This application claims the benefit of priority to Taiwan Patent Application No. 107117954, filed on May 25, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor drive circuit, and more particularly to a motor driving circuit capable of utilizing a time-sharing mechanism to enable a single function parameter pin to achieve two or more motor performance adjustment functions.

BACKGROUND OF THE DISCLOSURE

In the existing motor drive circuit, adjustment settings for motor performance include speed curve adjustment, phase angle adjustment, soft start adjustment, and duty cycle adjustment. However, under the premise of limited number of pins, some performance tuning features in the settings of the pins may be abandoned.

In order to increase the functionality of the motor driving circuit, circuit architectures adapting high order protocols, such as I2C, SPI, SMBUS, are needed. However, circuit architectures adapting high order protocols are not only costly but also limit the variation of IC application, and additional programming will also result in more costs and defects during production, which may further result in incompatibility with existing motor applications.

Therefore, in order to allow the single pin of the motor driving circuit to have various adjustment functions by improving the circuit design, so as to overcome the above-mentioned defects, has become an important issue.

SUMMARY OF THE DISCLOSURE

In response to the above-referenced technical inadequacies, the present disclosure provides a motor driving circuit for driving a motor. The motor driving circuit includes a position detecting circuit, a drive processing circuit, an adjustment voltage source, a parameter reading unit, and a timing unit. The position detecting circuit is configured to detect a position of a rotor of the motor and generate a position signal. The drive processing circuit is connected to the position detecting circuit and a voltage adjusting pin, the drive processing circuit drives the motor according to the position signal from the position detecting circuit. The adjusting voltage source is connected to the voltage adjusting pin and a function parameter pin through a voltage dividing circuit. The parameter reading unit is respectively connected to the function parameter pin, a first register and a second register, and the first register and the second register are respectively connected to the drive processing circuit. The timing unit is respectively connected to the parameter reading unit, the first register and the second register, and is configured to generate a timing signal. The parameter reading unit processes the timing signal to obtain consecutive first and second time intervals. In the first time interval, the parameter reading unit is configured to read a first function parameter voltage of the function parameter pin and generate a first function parameter data to be written into the first register. In the second time interval, the parameter reading unit is configured to read a second function parameter voltage of the function parameter pin and to generate a second function parameter data to be written into the second register. The drive processing circuit is configured to read the first register and the second register, and to drive the motor according to the first function parameter data and the second function parameter data.

Preferably, the parameter reading unit includes an analog-digital (A/D) converter and an oscillating counting unit. The analog-digital converter is respectively connected to the first register, the timing unit and the function parameter pin. In the first time interval, the timing unit is configured to activate the analog-digital converter, and the analog-digital converter is configured to convert the first function parameter voltage of the function parameter pin into the first functional parameter data to be written into the first register.

Preferably, the parameter reading unit includes an analog-digital converter and a current source. The analog-digital converter is respectively connected to the first register, the second register, and the function parameter pin, the current source is connected to a reference potential terminal through a switching element, a control terminal of the switching element is connected to the timing unit, and a reference potential terminal has a reference potential. In the first time interval, the timing unit is configured to turn off the switching element, and the analog-digital converter is configured to convert the first function parameter voltage of the function parameter pin to the first function parameter data to be written into the first register.

One of the advantages of the present disclosure is that the motor driving circuit provided by the present disclosure can use the concept of time-sharing to provide single function parameter pins with more than two function parameter settings, thereby increasing flexibility for the functional design of the motor driving circuit by the technical features of "generating the first function parameter data to be written into the first register, and generating the second function parameter data to be written into the second register" and "the drive processing circuit reads the first register and the second register, and drives the motor according to the first function parameter data and the second function parameter data".

For better understanding of the features and technical content of the present disclosure, reference should be made to the following detailed descriptions and drawings of the present disclosure, however, the drawings are provided for the purpose of providing references and illustrations only, and are not intended to limit the present disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

Figure 1:
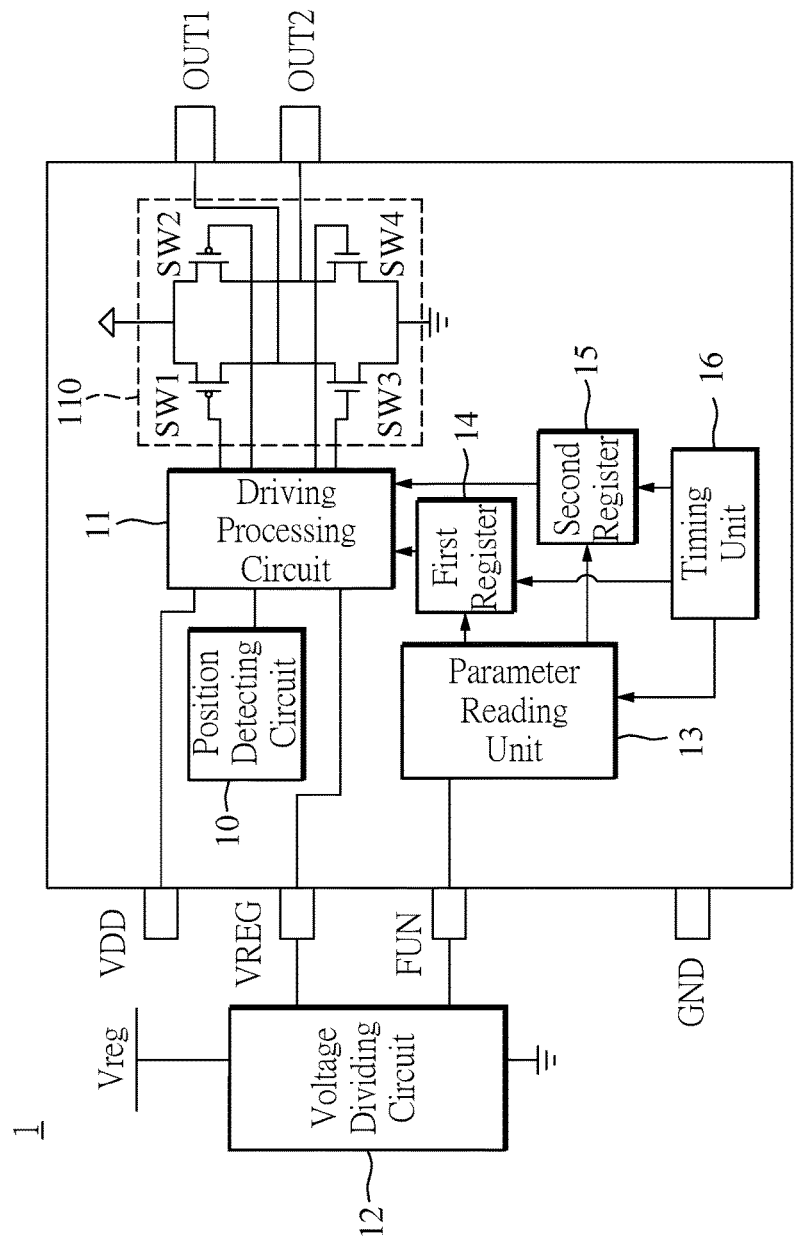
FIG. 1 is a circuit schematic diagram of a motor driving circuit in a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The embodiments of the present disclosure relating to the "motor driving circuit" are described by way of specific embodiments, and those skilled in the art can understand the advantages and effects of the present disclosure from the disclosure of the present specification. The invention can be implemented or applied in various specific embodiments, and various modifications and changes can be made without departing from the spirit and scope of the present disclosure. In addition, the drawings of the present disclosure are merely illustrative and are not intended to be stated in the actual size. The following embodiments will further explain the related technical content of the present disclosure, but the disclosure is not intended to limit the scope of the present disclosure.

It should be understood that, although the terms "first", "second", "third", and the like may be used herein to describe various elements or signals, however, these elements or signals are not limited by these terms. These terms are primarily used to distinguish one element from another, or one signal from another. In addition, the term "or" as used herein may include a combination of any one or more of the associated listed items, depending on the actual situation.

First Embodiment

FIG. 1 is a circuit schematic diagram of a motor driving circuit in a first embodiment of the present disclosure. Referring to FIG. 1, the first embodiment of the present disclosure provides a motor driving circuit 1 for driving a motor. The motor driving circuit 1 includes a position detecting circuit 10, a drive processing circuit 11, an adjusting voltage source Vreg, a parameter reading unit 13 and a timing unit 16. The motor driving circuit 1 may include a plurality of pins, such as a first output terminal OUT1, a second output terminal OUT2, a voltage supply pin VDD, a voltage adjusting pin VREG, a function parameter pin FUN and a ground pin GND, as shown in FIG. 1.

The position detecting circuit 10 is configured to detect the position of the rotor of the motor and generate a position signal. The position detecting circuit 10 may be, for example, a Hall sensor, which can be disposed adjacent to the motor and used to sense a variation in the magnetic field of the motor and determine a position of single magnetic pole, so as to generate a position signal accordingly.

The position detecting circuit 10 may further include a Hall signal processing unit to amplify the generated Hall signal. The Hall signal processing unit may receive the Hall signal generated by the Hall sensor, and detect the timing for switching the driving phase according to the same. The position detecting circuit 10 may further include a comparator for comparing the pairing of the Hall signals, and outputting the output signal of the comparator as a signal indicating the timing for switching the driving phases. Alternatively, the position detecting circuit 10 may include an amplifier that amplifies the difference between the pairing of the Hall signals.

The drive processing circuit 11 may be connected to the position detecting circuit 10, the voltage adjusting pin VREG and the voltage supply pin VDD, and the drive processing circuit 11 drives the motor according to the position signal of the position detecting circuit 10. The motor driving circuit 1 further includes a full bridge circuit 110, which may be included in the drive processing circuit 11 or independently provided. The full bridge circuit 110 has a first switch SW1, a second switch SW2, a third switch SW3 and a fourth switch SW4, the first switch SW1 is coupled between the drive processing circuit 11 and the first output terminal OUT1, the second switch SW2 is coupled between an input terminal of the drive processing circuit 11 and the second output terminal OUT2, the third switch SW3 is coupled to between the first output terminal OUT1 and the ground terminal, and the fourth switch SW4 is coupled between the second output terminal OUT2 and the ground terminal.

Next, the voltage adjusting source Vreg can be connected to the adjustment voltage pin VREG and the function parameter pin FUN through the voltage dividing circuit 12. The parameter reading unit 13 may be connected to the function parameter pin FUN, the first register 14 and the second register 15. The first register 14 and the second register 15 are respectively connected to the drive processing circuit 11.

In addition, the motor driving circuit 1 further includes the timing unit 16, which is correspondingly connected to the parameter reading unit 13, the first register 14 and the second register 15, and is configured to generate a timing signal. The timing signal may generate timing signals with different voltage levels according to a preset first time interval and a preset second time interval. Further, the parameter reading unit 13 may process the timing signal mentioned above to obtain the consecutive first and second time intervals.

Figure 2:
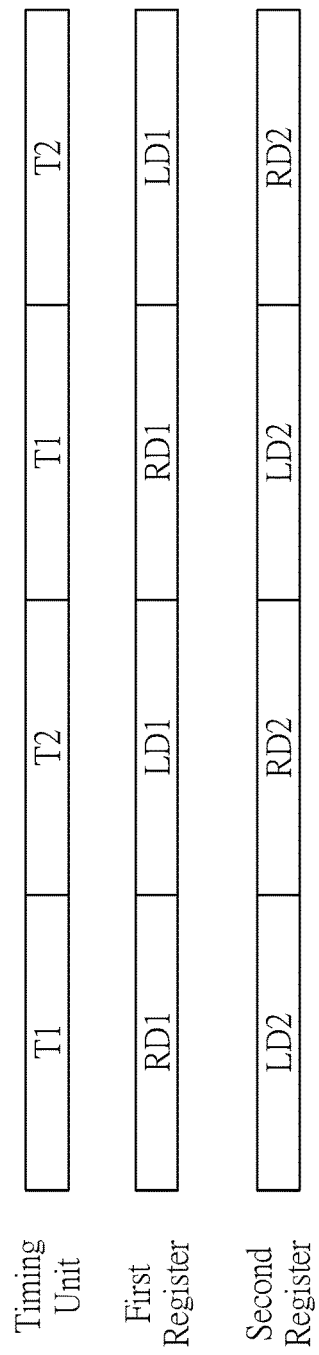
FIG. 2 is a signal timing chart of the motor driving circuit of the first embodiment of the present disclosure.

Reference is now made to FIG. 2, which is a signal timing chart of the motor driving circuit of the first embodiment of the present disclosure. As shown in FIG. 2, in order to provide the function parameter pin FUN with two function parameter settings, the present disclosure applies a time-sharing architecture. For example, in a first time interval T1, the parameter reading unit 13 can be configured to read a first function parameter voltage of the function parameter pin FUN, and to generate a first function parameter data RD1 to be written into the first register 14. At the same time, no data is written into the second register 15, and thus the data of the second register 15 serves as a second latch data LD2 in the first time interval T1.

On the other hand, in a second time interval T2, the parameter reading unit 13 can be configured to read the second function parameter voltage of the function parameter pin FUN and to generate a second function parameter data RD2 to be written into the second register 15. At the same time, no data is written to the first register 14, and thus the data of the first register 14 serves as a first latch data LD1 in the second time interval T2.

Therefore, with the configuration of the timing unit 16, the drive processing circuit 11 can be configured to read the first register 14 and the second register 15, and further adjusts the performance of the motor according to the read first function parameter data RD1 and the second The function parameter data RD2. For example, the first function parameter data RD1 and the second function parameter data RD2 may be setting data for motor performance adjustment, for example, including a speed curve adjustment, a phase angle adjustment, a soft start adjustment, and a duty cycle adjustment data.

Therefore, with the above configuration, the single function parameter pin can be provided with various setting functions under the limitation of the number of pins of the motor driving circuit, so as to increase flexibility of the functional design of the motor driving circuit.

This embodiment is merely illustrative of the core concept of the present disclosure, which will be described in more detail in the following embodiments in accordance with the accompanying drawings.

Second Embodiment

Figure 3:
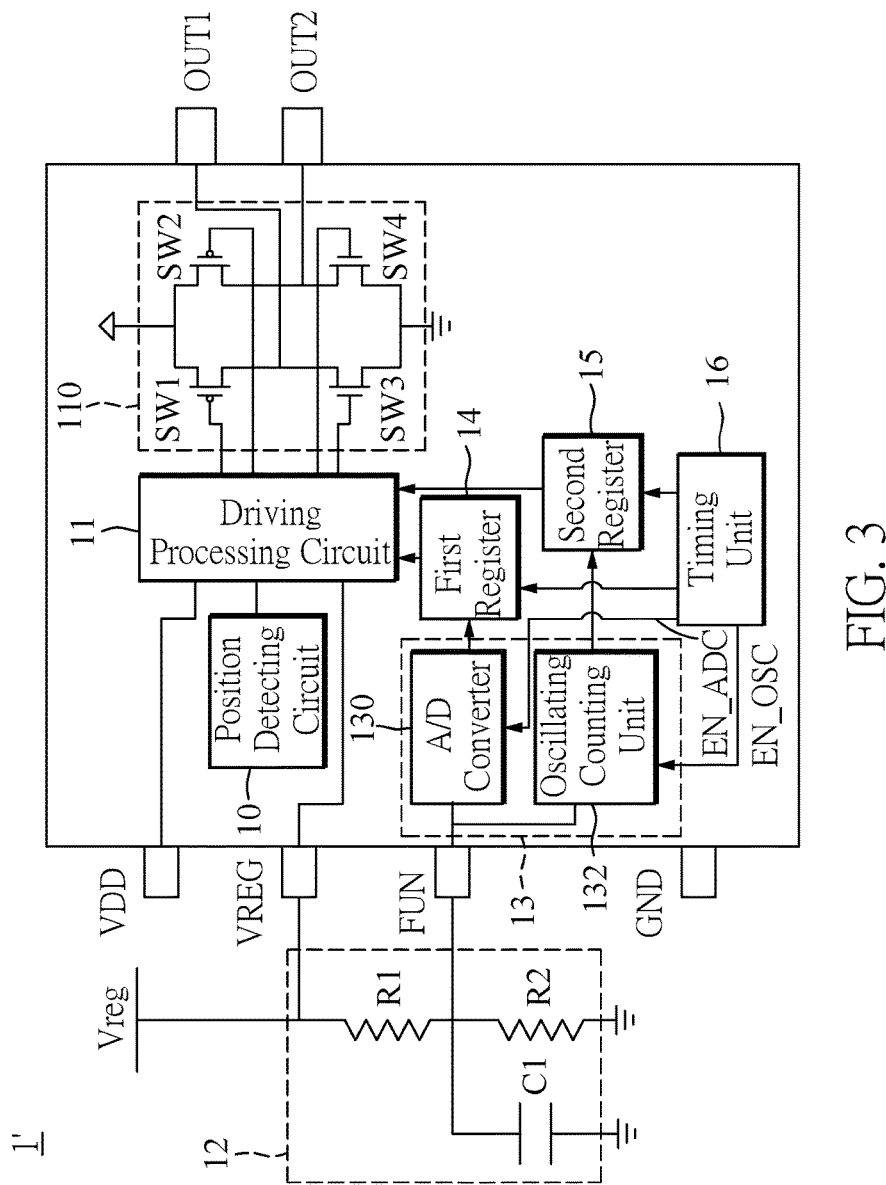
FIG. 3 is a circuit schematic diagram of a motor driving circuit of a second embodiment of the present disclosure.

FIG. 3 is a circuit schematic diagram of a motor driving circuit of a second embodiment of the present disclosure. Reference is now made to FIG. 3. the second embodiment of the present disclosure provides a motor driving circuit 1' for driving a motor. The motor driving circuit 1' includes the position detecting circuit 10, the drive processing circuit 11, the voltage adjusting source Vreg, the parameter reading unit 13 and the timing unit 16. The motor driving circuit 1' may include a plurality of pins, such as the first output terminal OUT1, the second output terminal OUT2, the voltage supply pin VDD, the voltage adjusting pin VREG, the function parameter pin FUN and the ground pin GND, as shown. In the present embodiment, similar elements are denoted with similar reference numerals, and repeated description is omitted herein.

Further, in the present embodiment, the parameter reading unit 13 includes an analog-digital converter (ADC) 130 and an oscillating counting unit 132. The analog-digital converter 130 is connected to the first register 14, the timing unit 16, and the function parameter pin FUN, respectively. The oscillating counting unit 132 is connected to the second register 15, the timing unit 16, and the function parameter pin FUN. The timing unit 16 can be a clock generation circuit known to those skilled in the arts, which may be configured to provide signals having different voltage levels in different time intervals.

In addition, the voltage dividing circuit 12 further includes a first resistor R1, a second resistor R2, and a capacitor C1. The first resistor R1 is connected between the voltage adjusting pin VREG and the function parameter pin FUN, and the second resistor R2 is connected between the function parameter pin FUN and the ground terminal, and the capacitor C1 is connected between the function parameter pin FUN and the ground terminal, and thus an RC circuit is formed.

Figure 4:
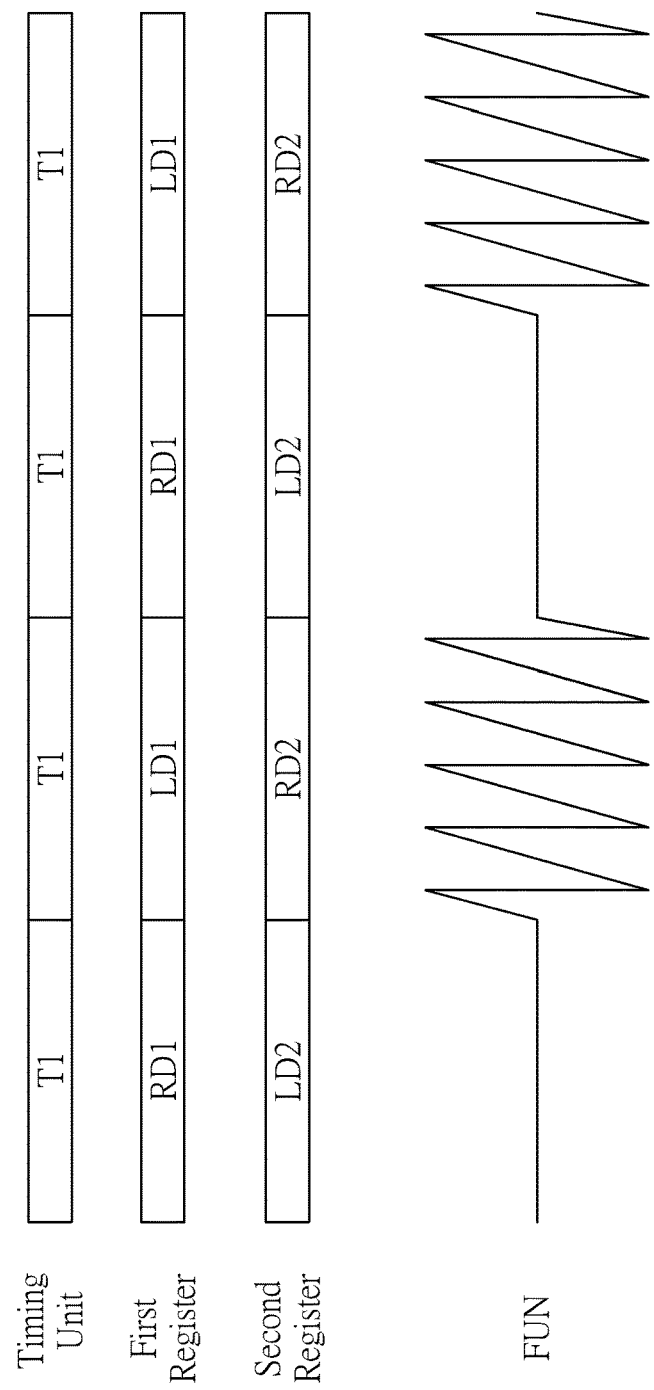
FIG. 4 is a signal timing chart of the motor driving circuit of the second embodiment of the present disclosure.

More specifically, reference is now made to FIG. 4, which is a signal timing chart of a motor driving circuit of the second embodiment of the present disclosure.

Specifically, in the first time interval T1, the timing unit 16 may output an analog-digital converter enable signal EN_ADC to enable the analog-digital converter 130, and the analog-digital converter 130 may convert the first function parameter voltage of the function parameter pin FUN into the first function parameter data RD1 to be written into the first register 14.

In more detail, a comparator may be further provided between the analog-digital converter 130 and the function parameter pin FUN, and the comparator may compare the first function parameter voltage of the function parameter pin FUN with a reference voltage, and determine whether to output a signal of high or low potential to the analog-digital converter 130 according to the comparison result, and the signal is further converted into the first function parameter data RD1 to be written into the first register 14.

Moreover, the first functional parameter voltage is substantially the voltage division generated at the function parameter pin FUN by using the voltage adjusting source Vreg through the voltage dividing circuit 12. At the same time, the oscillating counting unit 132 is in the state of disabling and does not write data into the second register 15, and thus the data of the second register 15 is served as the second latch data LD2 in the first time interval T1.

On the other hand, in the second time interval T2, the timing unit 16 is configured to turn off (disable) the analog-digital converter 130, and sends an oscillating counting unit enable signal EN_OSC to enable the oscillating counting unit 132. The oscillating counting unit 132 is configured to transmit an oscillating signal to the function parameter pin FUN and generate a second function parameter voltage at the function parameter pin FUN. As shown in FIG. 4, the potential of the function parameter pin FUN is oscillated, and the oscillating counting unit 132 is further configured to count the second functional parameter voltage, and the counted value may be converted to a second functional parameter data RD2 to be written into second register 15. At the same time, no data is written into the first register 14. Therefore, in the second time interval T2, the data of the first register 14 is latched and serves as the first latch data LD1.

Therefore, with the configuration of the timing unit 16, the drive processing circuit 11 can be configured to read the first register 14 and the second register 15, and further adjusts the performance of the motor according to the read first function parameter data RD1 and the second function parameter data RD2. For example, the first function parameter data RD1 and the second function parameter data RD2 may be setting data for motor performance adjustment, including a speed curve adjustment, a phase angle adjustment, a soft start adjustment, and a duty cycle adjustment data.

Therefore, with the above configuration, the single function parameter pin can be provided with various setting functions under the limited number of pins of the motor driving circuit, so as to increase flexibility of the functional design of the motor driving circuit. At the same time, through the technical features of "analog-digital converter and oscillating counting unit," the flexibility for designing the motor driving circuit may be improved by using the concept of time-sharing to read different settings.

Third Embodiment

Figure 5:
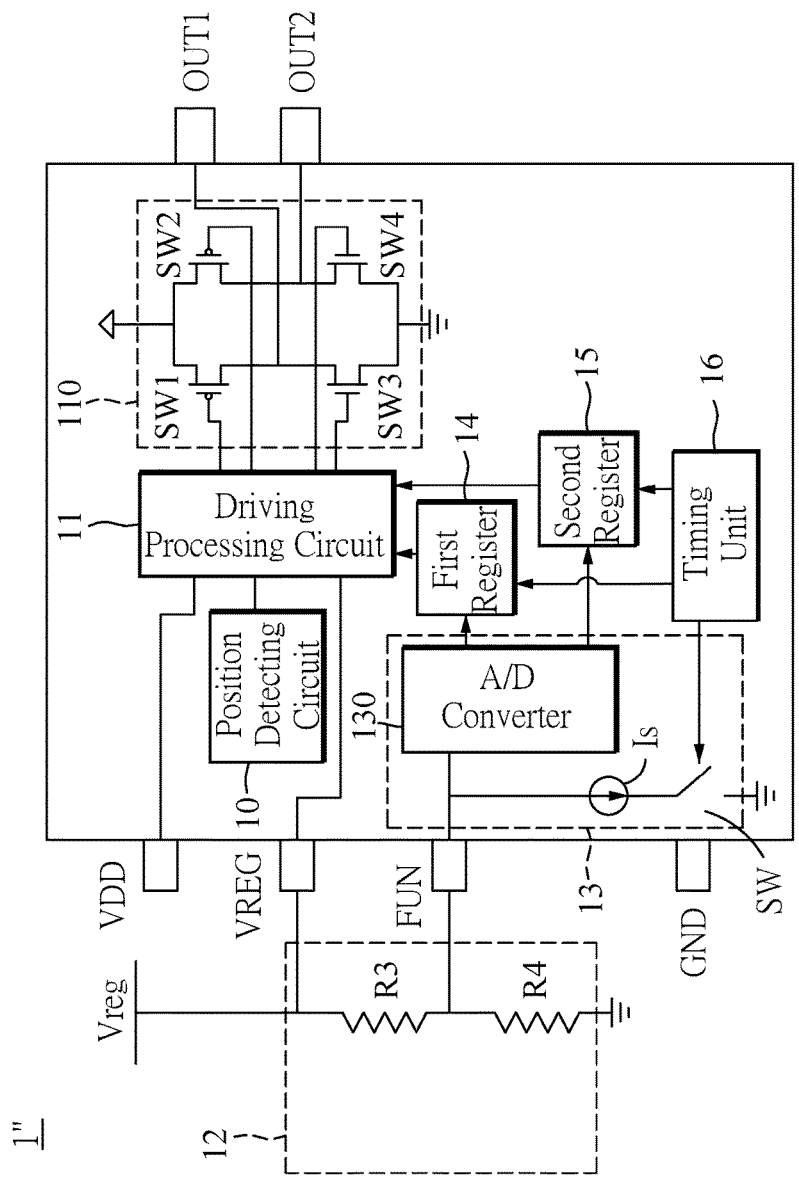
FIG. 5 is a circuit schematic diagram of a motor driving circuit according to a third embodiment of the present disclosure.

FIG. 5 is a circuit schematic diagram of a motor driving circuit according to the third embodiment of the present disclosure. Reference is now made to FIG. 5. the third embodiment of the present disclosure provides a motor driving circuit 1" for driving a motor. The motor driving circuit 1" includes the position detecting circuit 10, the drive processing circuit 11, the voltage adjusting source Vreg, the parameter reading unit 13 and the timing unit 16. The motor driving circuit 1" may include a plurality of pins, such as the first output terminal OUT1, the second output terminal OUT2, the voltage supply pin VDD, the voltage adjusting pin VREG, the function parameter pin FUN and the ground pin GND, as shown. In the present embodiment, similar elements are denoted with similar reference numerals, and the repeated description is omitted.

Further, the parameter reading unit 13 further includes the analog-digital converter 130 and a current source Is in the present embodiment. The analog-digital converter 130 is connected to the first register 14, the second register 15, and the function parameter pin FUN, respectively. The current source Is is connected to the reference potential terminal via a switching element SW. The ground terminal in this embodiment may be, for example, a ground terminal, and a control terminal of the switching element SW is connected to the timing unit 16. The reference potential terminal may have a reference potential which may be, for example, a ground potential in the present embodiment. The timing unit 16 can be a clock generation circuit known to those skilled in the arts, which may be configured to provide signals having different voltage levels in different time intervals.

In addition, the voltage dividing circuit 12 includes a third resistor R3 and a fourth resistor R4. The third resistor R3 is connected between the voltage adjusting pin Vreg and the function parameter pin FUN, and the fourth resistor R4 is connected between the function parameter pin FUN and the ground terminal.

Figure 6:
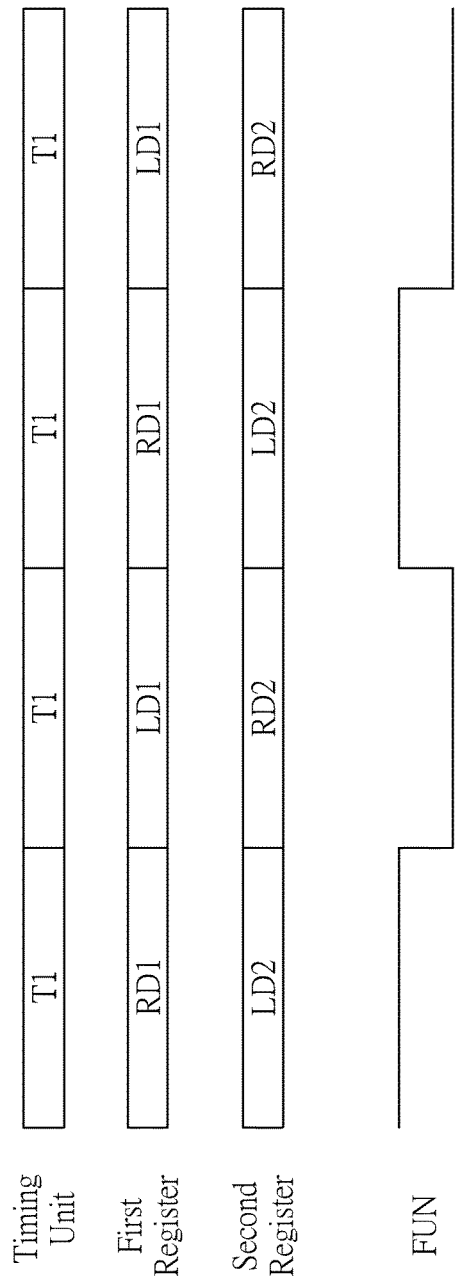
FIG. 6 is a signal timing chart of the motor driving circuit of the third embodiment of the present disclosure.

More specifically, reference is now made to FIG. 6, which is a signal timing chart of the motor driving circuit of the third embodiment of the present disclosure.

Specifically, in the first time interval T1, the timing unit 16 may be configured to turn off the switch element SW, i.e., to disable the current source Is. At this time, the analog-digital converter 130 is configured to analyze the setting of the function parameter pin FUN as a value of the resistance voltage division, which is used as the first function parameter voltage and is converted into the first function parameter data RD1 by using the analog-digital converter 130, and then is written into the first register 14.

In more detail, a comparator may be further provided between the analog-digital converter 130 and the function parameter pin FUN, and the comparator may compare the first function parameter voltage of the function parameter pin FUN with a reference voltage, and determine whether to output a signal of high or low potential to the analog-digital converter 130 according to the comparison result, and the signal is further converted into the first function parameter data RD1 to be written into the first register 14.

Moreover, the first functional parameter voltage is substantially the voltage division generated at the function parameter pin FUN by using the voltage adjusting source Vreg through the voltage dividing circuit 12. At the same time, the oscillating counting unit 132 is disabled and does not write data into the second register 15, and thus the data of the second register 15 serves as the second latch data LD2 in the first time interval T1.

On the other hand, in the second time interval T2, the timing unit 16 is configured to turn on the switching element SW, that is, to enable the current source Is. At this time, the potential of the function parameter pin FUN drops because of the configuration of the current source Is and the ground terminal, the analog-digital converter 130 is configured to analyze the setting of the function parameter pin FUN as another value of the resistance voltage division, which is used as the second function parameter voltage, and is converted into the first function parameter data RD2 by using the analog-digital converter 130, to be written into the first register 14.

At the same time, no data is written into the first register 14. Therefore, in the second time interval T2, the data of the first register 14 is latched and serves as the first latch data LD1.

Therefore, with the configuration of the timing unit 16, the drive processing circuit 11 can be configured to read the first register 14 and the second register 15, and further adjust the performance of the motor according to the read first function parameter data RD1 and the second function parameter data RD2. For example, the first function parameter data RD1 and the second function parameter data RD2 may be setting data for motor performance adjustment, including a speed curve adjustment, a phase angle adjustment, a soft start adjustment, and a duty cycle adjustment data.

On the other hand, in this embodiment, the current source Is may be connected to a reference potential terminal having a high potential through the switching element SW, which is a configuration of a pull-up current source Is, or the current source Is may be replaced by a resistor, which is a pull-up or pull-down resistor. The analog-digital converter 130 may analyze the setting of the function parameter pin FUN as yet another value of the resistance voltage division, which is used as the second function parameter voltage.

On the other hand, a third time interval may be further set other than the first time interval T1 and the second time interval T2 and an additional register may also be provided. A third function may be set in the function parameter pin FUN with the timing unit 16 at the same time, or even, more similar features may be added.

Therefore, with the above configuration, the single function parameter pin can be provided with various setting functions under the limited number of pins of the motor driving circuit, so as to increase flexibility of the functional design of the motor driving circuit. At the same time, by utilizing the technical feature of "analog-digital converter and pull-up/pull-down current source", different settings may be read by using the concept of time-separating to improve the flexibility for designing the motor driving circuit.

One of the advantages of the present disclosure is that the motor driving circuit provided by the present disclosure can use the concept of time-sharing to provide single function parameter pins with more than two function parameter settings, thereby improving flexibility for the functional design of the motor driving circuit by the technical features of "generating the first function parameter data and writing into the first register, and generating the second function parameter data and writing into the second register" and "the drive processing circuit reads the first register and the second register, and drives the motor according to the first function parameter data and the second function parameter data".

Furthermore, by utilizing the technical features of "analog-digital converter", "oscillating counting unit", and "pull-up/pull-down current source", different settings may be read by using the concept of time-sharing to improve the flexibility for designing the motor driving circuit.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor driving circuit, adapted for driving a motor, which comprising:
    a position detecting circuit configured to detect a position of a rotor of the motor and generate a position signal;
    a drive processing circuit connected to the position detecting circuit and a voltage adjusting pin, wherein the drive processing circuit drives the motor according to the position signal from the position detecting circuit;
    an adjusting voltage source connected to the voltage adjusting pin and a function parameter pin through a voltage dividing circuit;
    a parameter reading unit respectively connected to the function parameter pin, a first register and a second register, wherein the first register and the second register are respectively connected to the drive processing circuit;
    a timing unit respectively connected to the parameter reading unit, the first register and the second register, and configured to generate a timing signal,
    wherein the parameter reading unit processes the timing signal to obtain consecutive first and second time intervals,
    wherein in the first time interval, the parameter reading unit is configured to read a first function parameter voltage of the function parameter pin and generate first function parameter data to be written into the first register, and
    wherein in the second time interval, the parameter reading unit is configured to read a second function parameter voltage of the function parameter pin and generate second function parameter data to be written into the second register,
    wherein the drive processing circuit is configured to read the first register and the second register, and to drive the motor according to the first function parameter data and the second function parameter data.

2. The motor driving circuit of claim 1, wherein the parameter reading unit includes:
    an analog-digital converter respectively connected to the first register, the timing unit and the function parameter pin;
    an oscillating counting unit respectively connected to the second register, the timing unit and the function parameter pin,
    wherein in the first time interval, the timing unit is configured to activate the analog-digital converter, and the analog-digital converter is configured to convert the first function parameter voltage of the function parameter pin into the first functional parameter data to be written into the first register.

3. The motor driving circuit of claim 2, wherein the voltage dividing circuit includes a first resistor, a second resistor and a capacitor, the first resistor is connected between the voltage adjusting pin and the function parameter pin, the second resistor is connected between the function parameter pin and a ground terminal, and the capacitor is connected between the function parameter pin and the ground terminal.

4. The motor driving circuit of claim 3, wherein the first parameter voltage is a resistor voltage generated at the function parameter pin by using the adjusting voltage source through the voltage dividing circuit.

5. The motor driving circuit of claim 3, wherein in the second time interval, the timing unit is configured to disable the analog-digital converter and to enable the oscillating counting unit, the oscillating counting unit is configured to transmit an oscillating signal to the function parameter pin to generate the second function parameter voltage, the oscillating counting unit is further configured to count the second function parameter voltage to be converted as the second function parameter data to be written into the second register.

6. The motor driving circuit of claim 1, wherein the parameter reading unit includes:
    an analog-digital converter respectively connected to the first register, the second register, and the function parameter pin;
    a current source connected to a reference potential terminal through a switching element, wherein a control terminal of the switching element is connected to the timing unit, and the reference potential terminal has a reference potential,
    wherein in the first time interval, the timing unit is configured to turn off the switching element, and the analog-digital converter is configured to convert the first function parameter voltage of the function parameter pin to the first function parameter data to be written into the first register.

7. The motor driving circuit of claim 6, wherein the voltage dividing circuit includes a third resistor and a fourth resistor, the third resistor is connected between the adjusting voltage pin and the function parameter pin, and the fourth resistor is connected between the function parameter pin and the ground terminal.

8. The motor driving circuit of claim 7, wherein the first function parameter voltage is a resistance voltage division generated at the function parameter pin by using the adjusting voltage source through the dividing voltage circuit.

9. The motor driving circuit of claim 7, wherein in the second time interval, the timing unit is configured to turn on the switching element to generate the second function parameter voltage at the function parameter pin, the analog-digital converter is configured to convert the second parameter voltage of the function parameter pin to the second function parameter data to be written into the first register.

10. The motor driving circuit of claim 9, wherein the reference potential is at a high potential or a low potential.

* * * * *